United States Patent Office 2,970,927
Patented Feb. 7, 1961

2,970,927
COATING COMPOSITIONS

Bernard David, 1434 Dairy Road, Charlottesville, Va.

No Drawing. Filed June 3, 1952, Ser. No. 291,581

2 Claims. (Cl. 106—266)

The present invention relates to coating compositions and, more particularly, it is concerned with the provision of compositions for protectively coating metallic surfaces which are subject to high temperatures.

In the heat treatment of metal objects, for example, metal fittings, it is highly desirable that a protective coating be applied to the objects undergoing treatment, in order that they do not become welded together. Numerous prior proposals have been made for effecting this result, but all such proposals have suffered from one disadvantage or another. For instance, it has been suggested to use materials, such as alumina or magnesia, suspended in a liquid vehicle as protective coatings or separating media, but these materials in actual practice do not adequately cover the surface of the objects undergoing treatment with the result that welding together of the objects occurs where the surfaces are left uncoated.

It is, therefore, one of the principal objects of the present invention to provide novel coating compositions for satisfactorily protecting metallic surfaces against the effects of relatively high temperatures to which they are to be exposed.

Another object of the invention is the provision of unique coating compositions which may be employed to prevent oxidation of metallic surfaces subject to high temperatures.

Still another object of the invention is the provision of coating compositions which are particularly adapted for use as separating media to prevent the adherence of metal objects undergoing heat treatments, such as annealing.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are accomplished, in accordance with the present invention, by the provision of coating compositions comprising a homogeneous suspension of colloidal silver, or other fine metal of low activity, and finely divided carbon, colloidal graphite being preferred, in a liquid vehicle.

The success of the invention resides, at least to a great extent, in the discovery that the colloidal fine metal of low activity and colloidal graphite cooperate with each other to provide a coating which is peculiarly adapted for application to metallic surfaces undergoing heat treatment or otherwise subjected to high temperatures, to prevent the oxidation, corrosion or possible welding together of the coated metal.

The exact manner in which the graphite and fine metal function to give the results of the invention is not completely understood. It is believed that during heat treatment the fine metal particles take on a more or less sponge-like or porous appearance with the graphite particles going into the pores formed by the fine metal to give a coating which completely prevents any contact between the actual surfaces of the coated metal objects. In any event, it is clear that these materials definitely co-act with each other because, when either the graphite or fine metal is used alone, the unique results of the invention cannot be obtained.

The invention, as broadly outlined above, may be more fully understood by the following typical examples of compositions prepared in accordance with the present invention.

Example I

This example is illustrative of one way of satisfactorily preparing a coating composition according to the invention starting with the following materials:

A suspension of colloidal silver in lacquer thinner and a suspension in water of colloidal graphite.

Utilizing the above constituents, a coating composition was prepared as follows:

The suspension of colloidal silver particles was well shaken and permitted to stand for a period of about twenty-four hours. In this time, the lacquer thinner and silver particles separated out in two layers, the liquid layer constituting about 50% of the volume of the suspension.

The colloidal graphite suspension was also permitted to stand so that the graphite particles settled out as a lower layer. The water layer was decanted off and then added, drop by drop, to the graphite until the grains thereof could no longer be felt, the graphite having a consistency like wet sand. The thus moistened graphite was mixed with castor oil in proportions of one part wet graphite for each two parts by weight of castor oil. The resulting mixture was then thoroughly stirred and three ounces of the graphite suspension added in dropwise fashion to ⅔ ounce of the colloidal silver suspension, the latter having been thoroughly mixed to form a homogeneous suspension of the silver in thinner prior to its admixture with the castor oil-graphite suspension. The resulting mixture of graphite and silver was thereafter thoroughly stirred to give a homogeneous suspension of the graphite and silver suspended in a liquid vehicle which, in this case, comprises a mixture of thinner and castor oil.

The graphite-silver mixture prepared as described in the preceding paragraphs may be applied in conventional manner, as by brushing, dipping, or spraying, to metal articles which are to be exposed to relatively high temperatures. As a typical example of such application, metal fittings were coated with the composition described in the foregoing example and then subjected to heat treatment at annealing temperatures, e.g., 1300 to 1800° F. After treatment, it was found that none of the articles were welded together, despite contact throughout the annealing treatment.

Example II

This example is illustrative of a procedure for making a composition according to the invention on a commercial basis starting with the colloidal graphite and fine metal in a dry form rather than as suspensions thereof in water, lacquer thinner and the like.

A suspension of colloidal silver was initially prepared by adding the finely divided or colloidal silver to an equal volume of lacquer thinner. Finely divided graphite of colloidal particle size was then added to water and thoroughly stirred to form a colloidal suspension of the graphite in water.

The water was decanted from the graphite suspension and thereafter added to the graphite in dropwise fashion until the latter was of a wet sand consistency as in Example I. To the thus moistened graphite there was then added the silver suspension in the proportions of one part silver suspension for four parts of wet graphite. The resulting mixture was well stirred and then added to sufficient castor oil to give the desired consistency dependent upon the manner in which the composition is to be applied.

It will be understood that the foregoing examples are given only for purposes of illustration and are not intended to limit the invention.

The exact manner in which the graphite and fine metal are suspended in the liquid vehicle is not critical to the success of the instant compositions, it being important only that the graphite and metal be sufficiently well mixed to provide the desired homogeneous suspension. Thus, while the foregoing examples show suspension of the colloidal silver in lacquer thinner prior to the addition thereto of the graphite moistened with water, as such, or suspended in castor oil, it will be appreciated that such preliminary suspension of the silver or moistening of the graphite only assist in the formation of the final graphite-fine metal suspension, but are not essential for carrying out the invention since the thinner and water utilized are both driven off during the subsequent heat treatment of the coated metal objects. As a matter of fact, rather than follow the procedures of the foregoing examples, the colloidal silver, or other fine metal, and graphite may be directly added as dry particles to the castor oil, or other vehicle, provided these materials are satisfactorily mixed together to provide a homogeneous suspension.

For present purposes, the graphite and fine metal may be homogeneously suspended in any liquid vehicle in which these materials can be suspended and which permits easy application of the desired coatings. Particularly suitable results have been obtained using castor oil, in any of its commercially available forms, but other non-drying oils similar to castor oil, either vegetable oils or mineral oils, may also be satisfactorily employed. The proportions of vehicle to graphite and fine metal may be widely varied, dependent upon the way the coating compositions are to be applied to the objects to be protected. Likewise, the proportions of fine metal to graphite also vary over rather wide ranges depending primarily upon the temperatures to which the compositions are to be exposed and, to some extent, the nature of the fine metal utilized. Generally speaking, when using colloidal silver, excellent results have been obtained using about eight parts of graphite for each part of silver, but satisfactory results are also obtained using other ratios of graphite to metal, e.g., 7.5 to 1.

As to the low activity fine metals which may be utilized in the present compositions, the foregoing examples illustrate the use of colloidal silver and this metal is preferred for economical reasons. However, other low activity fine metals, and in particular, gold and platinum may also be used with advantage either individually or in admixture with each other or silver. Any of the commercially available colloidal forms of these metals and graphite, e.g., suspensions of these materials in water or oil or the substantially dry particles thereof, are satisfactory for use in accordance with the present invention.

The nature of the coating, after the coated metal surface has been exposed to high temperatures, depends primarily upon the degree and extent of the heat treatment. If the temperatures are relatively low, for example, below the vaporization point of the castor oil or other vehicle, it will be appreciated that the coating will remain moist and function more or less as a lubricating composition. On the other hand, should relatively high temperatures be employed, for example, temperatures in the neighborhood of 1300° to 1800° F., the castor oil, or other vehicle, will be vaporized, leaving a protective coating which consists essentially of the graphite and silver, gold or platinum, whichever fine metal is included in the composition. In either case, the coated surface is, for all practical purposes, fully protected against oxidation, corrosion, or the tendency to be welded to other surfaces exposed to heat and, after the high temperature exposure, the coated objects may be treated for removal of the coating to leave a completely unaffected finish.

As indicated above, the compositions of the present invention are particularly useful for preventing the welding together of metal objects which are undergoing heat treatment. In addition, these coating compositions prevent oxidation of metal surfaces which are subjected to heat treatment, such as annealing, tempering and normalizing or which, in operation, tend to be heated up to relatively high temperatures. For instance, when metal articles are subjected to an annealing or tempering treatment, the treating conditions are frequently highly oxidizing, with the result that a severe scale formation occurs on the articles being treated. Application of the coatings of the present invention eliminates such scale formation and, if desired, these coatings may be readily removed, as by sand blasting, to give metal surfaces with highly satisfactory finishes.

The novel principles of this invention are broader than the specific embodiments recited above and, rather than unduly extend this disclosure by attempting to list all the numerous modifications which have been conceived and reduced to practice during the course of this development, these novel features are defined in the following claims.

What is claimed is:

1. A composition for protectively coating metallic surfaces against the effects of high temperature consisting essentially of a homogeneous suspension in a liquid vehicle of colloidal graphite and at least one colloidal metal of low activity, said metal being selected from the group consisting of silver, gold and platinum, said liquid vehicle being selected from the group consisting of non-drying vegetable oils and mineral oils, wherein is contained between about 7.5 and 8 parts of graphite for each part of said metal.

2. A composition for protectively coating metallic surfaces against the effects of high temperature consisting essentially of a homogeneous suspension in castor oil of colloidal graphite and colloidal silver, wherein the ratio of graphite to silver is about 8:1.

References Cited in the file of this patent

UNITED STATES PATENTS

| 183,343 | Sweeney | Oct. 17, 1876 |
| 1,460,317 | Duke | June 26, 1923 |
| 2,324,729 | Schrohe et al. | July 20, 1943 |

FOREIGN PATENTS

| 784,833 | France | July 25, 1935 |
| 782,956 | France | Mar. 25, 1935 |
| 294,656 | Great Britain | Feb. 14, 1929 |
| 212,914 | Great Britain | June 4, 1925 |
| 432,278 | Great Britain | July 2, 1935 |

OTHER REFERENCES

Colloid Chemistry (Alexander), volume III, pages 179–181, 498 and 499.